US012717208B2

(12) United States Patent
Liu et al.

(10) Patent No.: US 12,717,208 B2
(45) Date of Patent: Aug. 25, 2026

(54) ELECTRICALLY CONTROLLED METASURFACE FOR LARGE-ANGLE BEAM STEERING AND LIDAR APPLICATIONS

(71) Applicant: MAX-PLANCK-GESELLSCHAFT ZUR FÖRDERUNG DER WISSENSCHAFTEN E.V, Munich (DE)

(72) Inventors: Laura Na Liu, Stuttgart (DE); Jianxiong Li, Tianjin (CN); Robin Kaissner, Stuttgart (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 18/553,132

(22) PCT Filed: Mar. 30, 2022

(86) PCT No.: PCT/EP2022/058480
§ 371 (c)(1),
(2) Date: Sep. 28, 2023

(87) PCT Pub. No.: WO2022/233503
PCT Pub. Date: Nov. 10, 2022

(65) Prior Publication Data

US 2024/0377700 A1 Nov. 14, 2024

(30) Foreign Application Priority Data

May 5, 2021 (EP) .................................... 21172284

(51) Int. Cl.
*G02F 1/29* (2006.01)
*B82Y 20/00* (2011.01)
(Continued)

(52) U.S. Cl.
CPC ............ *G02F 1/292* (2013.01); *G02B 1/005* (2013.01); *G02B 5/1809* (2013.01); *B82Y 20/00* (2013.01);
(Continued)

(58) Field of Classification Search
CPC .. G02F 1/292; G02F 2202/30; G02F 2202/26; B82Y 20/00; G02B 26/06;
(Continued)

(56) References Cited

U.S. PATENT DOCUMENTS 10,665,953 B1 * 5/2020 Akselrod .......... G02F 1/133553
11,487,183 B1 * 11/2022 Akselrod ............... B05D 5/063
(Continued)

FOREIGN PATENT DOCUMENTS

CN 111466036 A 7/2020
JP 2002082297 A * 3/2002

OTHER PUBLICATIONS

Hsiao et al. (2016) "Electrically active nanoantenna array enabled by varying the molecular orientation of an interfaced liquid crystal," RSCAdv . . . 6, 87, 84500-84504.
(Continued)

*Primary Examiner* — Jessica M Merlin
(74) *Attorney, Agent, or Firm* — LEYDIG, VOIT & MAYER, LTD.

(57) ABSTRACT

The invention relates to an optical component comprising a metasurface, wherein the metasurface comprises a repeating pattern of unit cells, wherein each unit cell comprises at least two different scattering structures, wherein first scattering structures are at least partially contacting a first substance having a first refractive index and second scattering structures are at least partially contacting a second substance, which differs from the first substance, wherein the second substance provides a refractive index which is variable
(Continued)

depending on an electrical control signal, wherein a plurality of pairs of first scattering structures contacting the first substance and second scattering structures contacting the second substance are arranged row-wise on electrodes, wherein electrodes supporting neighboring rows of pairs of first and second scattering structures are electrically separated from each other, and a LIDAR system comprising such an optical component. Furthermore, the invention relates to a method for amending a deflection angle of such an optical component.

18 Claims, 3 Drawing Sheets

(51) Int. Cl.
*G02B 1/00* (2006.01)
*G02B 5/18* (2006.01)
*G02B 26/06* (2006.01)

(52) U.S. Cl.
CPC ........ *G02B 26/06* (2013.01); *G02B 2207/101* (2013.01)

(58) Field of Classification Search
CPC ............ G02B 2207/101; G02B 5/1809; G02B 1/005; G02B 1/002; G02B 5/008; G02B 5/1971
See application file for complete search history.

(56) References Cited

U.S. PATENT DOCUMENTS

| | | | |
|---|---|---|---|
| 2018/0240653 | A1 | 8/2018 | Akselrod et al. |
| 2018/0321518 | A1 | 11/2018 | Atwater |
| 2019/0301025 | A1 | 10/2019 | Akselrod et al. |
| 2020/0371215 | A1 | 11/2020 | Jain et al. |

OTHER PUBLICATIONS

International Preliminary Report on Patentability, dated Oct. 24, 2023, corresponding to International Application No. PCT/EP2022/058480, (from which the present application claims priority,) 9 pp.

International Search Report and Written Opinion, mailed Mar. 14, 2022 in International Patent Application No. PCT/EP2021/083191.

Chen, Hou-Tong, Antoinette J. Taylor, and Nanfang Yu. “A review of metasurfaces: physics and applications.” Reports on progress in physics 79.7 (2016): 076401.

Extended European Search Report, mailed Nov. 16, 2021 in European Patent Application No. 21172284.8.

International Search Report, mailed Jul. 20, 2022 in International Patent Application No. PCT/EP2022/058480.

Staude, Isabelle, and Jörg Schilling. “Metamaterial-inspired silicon nanophotonics.” Nature Photonics 11.5 (2017): 274-284.

Office Action issued Apr. 22, 2026 in corresponding Chinese Patent Application Serial No. 202280025076.2.

* cited by examiner

ELECTRICALLY CONTROLLED METASURFACE FOR LARGE-ANGLE BEAM STEERING AND LIDAR APPLICATIONS

CROSS-REFERENCE TO RELATED APPLICATIONS

This application is a U.S. National Stage Application filed under 35 U.S.C. § 371 of International Application No. PCT/EP2022/058480, filed Mar. 30, 2022, which claims the benefit of European Application No. EP 21172284.8, filed May 5, 2021. Both of these applications are hereby incorporated by reference in their entireties.

The invention relates to an optical component comprising a metasurface with changeable optical properties depending on a control signal. Furthermore, the invention relates to a LIDAR system comprising such an optical component.

The invention is also relating to a method for amending a diffraction angle of an optical component by applying a control signal to selected electrodes of the optical component.

It is well known that the propagation of a beam of light, or electromagnetic radiation, can be determined completely by its phase and amplitude profiles at a given two-dimensional surface. Many optical devices or optical components have been employed in order to manipulate such optical beams. Typical optical devices for manipulating the propagation of the optical beams by inducing upon them a specific phase profile are lenses, prisms, mirrors, or holographic elements. In most cases, the manipulation is realized by thickness variations of the optical devices.

Conventional optics manipulate light only by refraction and propagation. Recently optical metasurfaces have been found to be suitable for manipulating a beam of light and substituting conventional optics in selected optical systems. Metasurfaces have been found to be able not only to change light properties such as phase and amplitude, but also its polarization.

Metasurfaces are (mostly planar) structures which can modulate the local properties of an optical beam. Typically, a metasurface is an artificial nanostructured interface that manipulates light by spatially arranged meta-atoms of subwavelength dimensions. These meta-atoms usually consist of plasmonic or dielectric nanoantennas, which can directly change light properties such as phase, amplitude, and polarization.

Optical metasurfaces (OM) are patterned layers that interact strongly with light, altering the light properties over a subwavelength thickness by scattering from subwavelength sized nanostructures. Thus, optical metasurfaces offer a fundamentally new method of light manipulation, including spectral selectivity, wavefront and polarization control. Furthermore, optical systems comprising optical metasurfaces could be much thinner compared to conventional optics. Metasurfaces provide a high resolution control over the phase profile of the optical beam. In particular, for holographic applications and beam shaping, metasurfaces are advantageous.

Known optical metasurfaces have in common, that the manipulation of light is realized by nanostructures which resonantly capture the light and re-emit it with a defined phase, polarization, modality and spectrum. This allows sculpting of light waves with unprecedented accuracy. Due to this additional advantages optical metasurfaces have experienced enormous advances in their complexity and functionalities over the past decade.

From US 2018/0321518 A1 an electrically tunable metasurface is known. It comprises a mirrored surface, a conductive layer, and a dielectric layer. The conductive layer and the dielectric layer are in direct contact and are thereby defining a conductor-dielectric interface. A plurality of subwavelength sized antenna elements is arranged on the dielectric layer and configured to establish a potential difference between the antenna elements and the mirrored surface. In conjunction with the geometry and the material composition of each of the subwavelength antenna elements, the conductive layer, and the dielectric layer, the propagation characteristics of incident electromagnetic waves is tunable by the electrically tunable metasurface.

A drawback of such optical metasurfaces known in the prior art is that their optical properties are fixed or their optical reconfigurability is strongly limited. Improved optical reconfigurability is desired, since it allows control of certain properties and functionalities of the optical metasurfaces.

US 2020/0371215 A1 discloses a tunable metasurface comprising an array of cylindrical structures arranged above a substrate. Each cylindrical structure includes an aperture filled with an optoelectrical material and is mechanically and electrically coupled to an electrode. Light passing from a light source through the cylindrical structure can be steered along a desired path by variating the applied voltage. A device comprising such a metasurface is considered to be suitable for LIDAR devices. However, the angle by which the light could be steered when passing the cylindrical structures is limited due to the height of the cylindrical structures.

The objective of the invention is to provide an improved optical component and an optical device, which overcomes the above-mentioned disadvantages. Integration of such an optical component in an optical device and especially a LIDAR device is desired. Furthermore, a method for amending the properties of a light beam reaching such an optical component in a variable and desired manner should be provided.

The problem is solved by the optical component according to claim 1, a LIDAR system according to claim 10 as well as a method according to claim 13. The further dependent claims provide preferred embodiments.

An optical component according to the invention comprises a metasurface. The metasurface comprises a repeating pattern of unit cells, wherein each unit cell comprises at least two different scattering structures. First scattering structures are at least partially contacting a first substance having a first refractive index, whereas second scattering structures are at least partially contacting a second substance, which differs from the first substance. An important feature of the inventive optical component is that the second substance provides a refractive index which is variable depending on an electrical control signal. Furthermore, a plurality of unit cells or pairs of first scattering structures contacting the first substance and second scattering structures contacting the second substance are arranged in an aligned manner on electrodes. In the following a plurality of unit cells arranged in an aligned manner on a single electrode is also denoted as array. Neighboring arrays or electrodes supporting aligned pairs of first and second scattering structures are electrically separated from each other. Such an optical component provides the possibility to amend the refractive index of the second substance of a pair of first and second scattering structures.

If reference is made to the first and/or second scattering structures these structures should be understood to be at least partially contacting the respective first or second substance. Accordingly, a pair of first and second scattering structures not only comprises the first and second scattering structure as such but also the first and second substance to be in contact with the respective first or second scattering structure. A pair of first and second scattering structures including the first and second substance is also understood to be a unit cell.

Due to the changeable difference between the refractive index of the first and the second substance the optical properties of such a pair of a first and a second scattering structure could be amended in a desired way. Preferably, at least the intensity and phase of light, scattered from a pair of a first and a second scattering structure, changes depending on the difference of the refractive index of the first and the second substance.

Preferably, the first and the second scattering structures generate a phase difference of the incoming radiation. Preferably, the first and second scattering structures are oriented and/or designed in respect to each other, such that the scattered light by the first scattering structure experiences a phase difference of IT in respect to the light scattered by the second scattering structure.

Preferably, each electrode supports a plurality of unit cells. In this embodiment, the pairs of first scattering structures contacting the first substance and the second scattering structures contacting the second substance are arranged in an aligned manner on a common electrode. Thus, along a direction of extension of the electrode, a first pair of first and second scattering structures is neighboring at least one further, second pair of first and second scattering structures. Preferably at least some pairs of first and second scattering structures are surrounded by more than one, preferably by exactly two pairs of first and second scattering structures along the longitudinal extension of the electrode.

Preferably, each pair of first and second scattering structures is neighboring at least one further, second pair of first and second scattering structures, which is arranged in a way that the first scattering structure of the first pair of scattering structures is arranged on the same side of an electrode with respect to its longitudinal extension as the first scattering structure of the second pair of scattering structures. Thus, also the first substance and the second substance of neighboring pairs are arranged on the same side of an electrode with respect to its longitudinal extension.

The longitudinal extension of an electrode should be understood as a direction along which this electrode extends further than in the other direction. For a cuboid electrode having a defined length, a defined width and a (small, or even neglectable) defined height, the longitudinal extension is understood as the direction of the electrode along which it extends more than along the others. Usually, this direction is considered to be the "length" direction. However, the geometry of an electrode is not limited to cuboid geometries.

In a preferred embodiment the electrode has a curved shape. That means that at least a segment of the electrode has a curved shape. In a preferred embodiment at least a segment of the electrode has a circular shape. In such an embodiment, preferably all first scattering structures associated to a single electrode are located radially inwards or outwards with respect to all second scattering structures located on the same electrode.

Preferably at least 100, preferably at least 250, more preferably at least 500, even more preferably at least 1000, most preferably at least 5000, pairs of first and second scattering structures on a common electrode form an array. Thus, a large number of unit cells could be switched together to desired optical properties.

In a preferred embodiment at least two, preferably all electrodes supporting aligned pairs of first and second scattering structures are electrically connected to a controller, which is suitable and intended for applying an individual control signal to each of these electrodes. This allows amending the optical properties of the scattering structures supported by each electrode individually. Thus, optical properties of each segment of the metasurface associated to a defined electrode could be adjusted in a predefined manner. By applying defined control signals to a plurality of electrodes, different optical properties of the metasurface as a whole could be realized.

Preferably, a plurality of arrays (or electrodes, each supporting a plurality of unit cells) are arranged in a predefined geometrical pattern. Preferably this geometrical pattern defines optical properties of the metasurface.

Preferably at least 100, preferably at least 300, more preferably at least 600, most preferably at least 1000, most preferably at least 5000, arrays comprising a plurality of first and second scattering structures are arranged on a first substrate. Preferably at least sections of at least two of these arrays are orientated parallel or concentrical.

Preferably, the metasurface is suitable for amending the first-order diffraction angle of light. In the context of the present invention, the first-order diffraction angle is also referred as "deflection angle" of the metasurface. Preferably the first-order diffraction angle of the metasurface is adjustable to specific needs by applying the control signal to selected electrodes (or arrays). Preferably the control signal is suitable for tuning the optical properties of an array to specific needs. By tuning the light output of designated electrodes to any state between an "off" state in which no light is diffracted due to destructive interference when the refractive index $\tilde{n}_2$ of the second substance is electrically tuned to be equal to the refractive index $\tilde{n}_1$ of the first substance, and an "on" state with maximum light output, when the refractive index $\tilde{n}_2$ of the second substance is electrically tuned to be strongly unequal to the refractive index $\tilde{n}_1$ of the first substance, desired quasi-continuous spatial patterns of different optical properties could be applied to the metasurface. This pattern acts as a grating for amplitude or phase modulation with an electrically tunable periodicity. By amending the pattern, the diffraction angles of the individual outputted diffraction orders can thus be dynamically adjusted to achieve a desired diffraction angle of an individual order, most preferably the first order.

In a preferred embodiment the electrodes supporting the aligned pairs of first and second scattering structures are linear and arranged parallel to each other. This embodiment allows the aligned pairs of first and second scattering structures to form linear structures, a plurality of which together could form a grating. Due to the possibility to amend the refractive index of the second substance depending on an electrical control signal while the refractive index of the first substance is kept (substantially) constant, the difference of the refractive index between the first substance and the second substance could be amended. This variable difference between the refractive index of the first and the second substance allows amending the optical properties of each array and, by amending the optical properties of many arrays in a coordinated manner, the amendment of the optical properties of the entire grating as a whole or the entire metasurface.

In a further preferred embodiment, at least segments of the electrodes supporting the aligned pairs of first and second scattering structures are circular and arranged concentrically with respect to each other. This embodiment allows the aligned pairs of first and second scattering structures to form circular structures, a plurality of which together could form a circular optical element, e.g. a lens or a (Fresnel) zone plate (FZP). By adjusting the optical properties of the pairs of those circular structures in a defined manner depending on its radial extension, focusing optics are possible.

In a preferred embodiment, neighboring electrodes supporting aligned pairs of first and second scattering structures are electrically separated from each other by a gap or an isolating material. Preferably, a width of the gap or the isolating material is small to allow a small grating constant (or lattice constant). Preferably the width is less than 1 μm, more preferably less than 500 nm, more preferably less than 380 nm, more preferably less than 200 nm, more preferably less than 100 nm, more preferably less than 50 nm and especially preferably less than 25 nm. However, the width is preferably wide enough to ensure that the neighboring electrodes are electrically isolated against each other. Thus, application of an individual control signal to each electrode is possible, preferably without interfering electrically with the neighboring electrode(s).

In a preferred embodiment, the electrical control signal applied to a defined number of electrodes supporting aligned pairs of first and second scattering structures is identical. This allows that aligned pairs of first and second scattering structures located on different electrodes provide the same optical properties (or light scattering properties). Thus, formation of repeating patterns of optical properties are possible. For example, the optical properties of the aligned pairs of first and second scattering structures of every second or every third (or every "n"-th) array could be set to be identical by application of the same control signal to the respective electrodes.

Preferably, the number of electrodes to which the identical electrical control signal is applied and/or the number of neighboring electrodes to which the identical electrical control signal is applied and/or the number of electrodes between two electrodes to which the identical electrical control signal is applied, correlates to a defined diffraction angle for incoming light in a direction orthogonal to the direction of the alignment of the pairs of first and second scattering structures. This embodiment allows application of different patterns of (local) optical properties to a metasurface. Further advantages of this embodiment are explained in detail in the description of FIG. 2.

As mentioned above, patterns of arrays providing defined optical properties could result in defined optical properties of the metasurface. It has been found that patterns are especially advantageous, in which some arrays of the metasurface provide the same optical properties. Thus, preferably to every "n"-th array along a longitudinal or radial direction of the metasurface the same control signal is applied. For example, the same electrical control signal is applied to every array, every second array or every third array. Furthermore, embodiments are advantageous in which the same control signal is applied to neighboring arrays. Thus, these neighboring arrays form blocks of similar optical properties which differ from the optical properties of one or more neighboring arrays. Preferably, between arrays or blocks of arrays having similar optical properties one or more arrays or blocks having one or more different optical properties are arranged.

The optical properties of the metasurface could be tuned in many ways. Preferably, the optical properties of the metasurface are tuned by applying an identical electrical control signal to a different number of electrodes and/or a different number of neighboring electrodes and/or electrodes having a different number of further electrodes between them.

In a first example, the optical properties of the metasurface are tuned by applying an identical electrical control signal to a different number of electrodes. For example, to every second electrode a control signal is applied to switch these electrodes to the "off" state in which no light is scattered due to destructive interference when the refractive index $\tilde{n}_2$ of the second substance is electrically tuned to be equal to the refractive index $\tilde{n}_1$ of the first substance. To the remaining electrodes, the control signal is applied for switching them to an "on" state with maximum light scattering output. Thus, a grating is formed, having a periodicity of a distance including 2 arrays. This configuration correlates to a large spatial frequency and results in a large diffraction angle (of an individual order). The optical properties of the metasurface could be tuned to a smaller diffraction angle (of an individual order) by applying the identical electrical control signal correlating to the "on" state to an increased number of neighboring electrodes, forming an "on" state block, followed by an "off" state block of the same number of electrodes switched to an identical control signal corresponding to the "off" state. The larger the number of electrodes in the individual blocks are, the smaller the spatial frequency will be and the smaller the diffraction angle will be. If all electrodes are switched to the "on" state, the angle for all diffraction orders will be 0.

In a second example, the optical properties of the metasurface are tuned by applying an identical electrical control signal to a different number of neighboring electrodes. For example, to a plurality of first pairs of neighboring electrodes the identical control signal is applied to turn these electrodes in the "off" state, whereas to every second pair of neighboring electrodes between these first pairs, the control signal is applied for turning these pairs in an "on" state. Thus, the number of electrodes in the "on" state and the "off" state are identical to the arrangement in which every second electrode is turned to the "on" state. However, the periodicity is increased to a distance including four arrays. In this configuration the diffraction angles of individual orders of the metasurface is decreased with respect to a configuration having the smaller periodicity of a distance including only two arrays. In this embodiment, preferably the size of each block comprising more than one array is increased.

In a third example, the optical properties of the metasurface are tuned by applying an identical electrical control signal to the electrodes having a different number of further electrodes between them. As explained with respect to the second example, the size of a block between two blocks or electrodes to which the same control signal is applied could be increased. However, it is possible but not necessary, that each block size is increases and/or only a single block or array is located between two blocks or arrays to which the same control signal is applied. It is preferred that between two electrodes to which an identical control signal is applied, a plurality of different control signals is applied to arrays between them. For example, it is possible that a metasurface in which every second array is switched to the "on" state (periodicity of two), is switched to different diffraction properties by applying the control signal for the "on" state to every third array. To the arrays in between, different control signals could be applied. For example, the control signal associated with the "on" state is applied to the first and forth array and the control signal associated with the "off" state is applied to a third array. Then, to the second array a further different control signal could be applied, wherein this control signal is associated with an intermediate state having a light output between zero ("off" state) and the maximum scattering intensity ("on" state). Thus, in a preferred embodiment, a repeating spatial intensity pattern, featuring for example a sawtooth profile, could be applied to the metasurface, wherein each repeating unit of this pattern (or each sawtooth) provides a stepwise or continuously decreasing or increasing intensity.

Tuning the optical properties of a metasurface by applying a sequence of different patterns as explained above, the optical properties of such a metasurface could be tuned continuously. For example, the (preferably first order) diffraction angle of such a metasurface with respect to light of a given wavelength could be changed. Preferably, changing the diffraction angle of such a metasurface could be achieved without moving (e.g. translating or rotating) the metasurface with respect to the light source. Thus, very small optical components (preferably without any part moving with respect to each other), providing a plurality of different (first order) diffraction angles for light of a given wavelength or even a mixture of wavelengths, could be realized.

In a preferred embodiment, the scattering structures comprise a metal. Metals have been found especially suitable, since metals could serve as antennas for light scattering. To avoid oxidation of the metal, noble metals are preferred. Thus, the metal is preferably selected from a group comprising ruthenium, rhodium, palladium, silver, osmium, iridium, platinum, rhenium, copper and gold. Preferably, the scattering structures mainly consist of one or more of these metals. "Consist of" should be understood as one or more of these metals of at least technical grade purity is the only component of these structures. Impurities are tolerated but no further substances are added. However, it is often desired that the properties of the scattering structures are more or less identical. This could be achieved in a preferred embodiment, in which the scattering structures comprise at least 95%, preferably ≥98%, more preferably ≥99%, most preferably ≥99.5% of one of these metals. Most preferably the scattering structures comprise at least 95%, preferably ≥98%, more preferably ≥99%, most preferably ≥99.5% of gold. Gold has been found advantageous, since it is extremely resistant against oxidation, provides very good electrical conductivity and techniques for producing nanoscaled structures, e.g. by electron-beam lithography (EBL), are known.

Advantageously the scattering structures are deployed as optical antennas. Preferably, when the electromagnetic radiation is interacting with an individual scattering structure, it causes the charge carriers present in the scattering structure to oscillate. This charge carrier oscillation and its associated electromagnetic fields is called a "surface plasmon". The interaction of the impinging electromagnetic radiation and the surface plasmon leads to a phase discontinuity. The electromagnetic radiation, which is transmitted through, reflected or scattered from the optical component undergoes therefore a phase jump.

In a preferred embodiment, the scattering structures are deployed as optical resonators, preferably optical antennas, more preferably in the form of rods, which are preferably orientated in the plane of the metasurface, more preferably in spatially varying orientations. As "rods" should be understood objects of cylindrical or cuboid geometry, which provide an extension along their longitudinal direction, which is at least 1.2-fold, preferably ≥1.5-fold, more preferably ≥2-fold longer than any extension along a width direction which is perpendicular to the longitudinal direction. It has been found that those rods are especially suitable for optical resonators or antennas. Preferably, the longitudinal direction of the optical resonators or rods are orientated in the plane of the metasurface, more preferably in spatially varying orientations. In such an orientation the optical resonators, antennas or rods are most effective.

Preferably, the geometry and size of the first and/or second scattering structures (as such) in an array is substantially the same. As "substantially" the same should be understood that a geometry and size of the first and/or second scattering structures in an array differs by ≤5%, preferably ≤3% and more preferably ≤1%. Most preferably, the geometry and size of the first and/or second scattering structures in a unit cell is the same. This could be achieved by techniques, e.g. electron-beam lithography, which enables manipulation of the shape on an nanometer scale. The geometry and size of the first and the second scattering structures could be different. However, it is preferred that all first scattering structures provide substantially the same geometry and size and all second scattering structures provide substantially the same geometry and size. Most preferably, geometry and size of all the (first and second) scattering structures in a unit cell are substantially the same.

In a preferred embodiment, the first and/or second scattering structures provide a cylindrical or parallelepipedal geometry ("rod"), preferably a geometry of a right circular cylinder or a rectangular cuboid. The longitudinal extension of each scattering structure is preferably in the range of 100-400 nm, preferably 150-300 nm, more preferably 175-225 nm, most preferably about 200 nm. This longitudinal extension provides suitable optical effects for a wide range of wavelengths including that of visible light. In a width direction, which extends perpendicular to the longitudinal direction, an extension in the range of 10-200 nm, preferably 20-150 nm, more preferably 30-100 nm, most preferably 50-80 nm has been found advantageous. In case of a (right) circular cylinder, the width direction is the diameter of the cylinder. For irregular cylinders or cuboids, the extension along two width directions perpendicular with respect to each other could be independently selected from these preferred ranges. For square cuboids these two width directions could be identical. Small deviations from the above-mentioned ideal geometries like rounded edges or corners should be encompassed by this wording.

Since the size of the first and/or second scattering structures can be readily changed (preferably in the ranges identified above) without affecting the working principle of the optical component, the optical component could be optimized for a desired wavelength band by adjusting the size of the first and/or second scattering structures. Thus, the optical component is for example easily adoptable for the integration with LIDAR systems working at different wavelengths (e.g. UV, VIS, IR).

Preferably, the dimensions of the scattering structures are smaller than the wavelength Λ of an incident electromagnetic radiation in order to employ subwavelength resolved manipulation of the electromagnetic radiation by the optical component. Smaller dimensions of the scattering structures provide a higher resolution of the optical component.

For most applications, the spacing between the scattering structures has an effect on the resolution. To provide a high resolution, the spacing between the scattering structures associated to different electrodes is preferably smaller than half of the wavelength Λ of the incident electromagnetic radiation in order to be manipulated by the optical component. Preferably, the spacing between two pairs of scattering structures associated to different electrodes is preferably less than 750 nm, preferably less than 500 nm, more preferably less than 380 nm, more preferably less than 250 nm, most preferably less than 190 nm. Since the wavelengths of visible light is usually considered to be in the range between 380 and approximately 800 nm, the shorter spacings between two pairs of scattering structures of the abovementioned list are especially suitable for manipulating visible light, even blue and violet light of short wavelength. However, also larger spacing could be advantageous for manipulating electromagnetic radiation of longer wavelength (e.g. emitted by a maser (Microwave Amplification by Stimulated Emission of Radiation) or infrared (IR-) laser (Light Amplification by Stimulated Emission of Radiation)).

In a preferred embodiment, the first substance comprises a dielectric material, preferably a dielectric polymer. More preferably this polymer is an acrylate polymer, most preferably polymethyl methacrylate (PMMA). Polymethyl methacrylate is preferred since its refractive index ($n_1+ik_1$) in the visible wavelength spectrum is $n_1=1.5$ and $k_1\approx0$. Preferably the refractive index of the first substance does not change significantly with the control signal. This means that the refractive index of the first substance does not change of more than 10%, preferably ≤5%, more preferably ≤2% after application of the control signal. Preferably the refractive index of the first substance does not change significantly within a temperature range of 0-40° C. This means that the refractive index of the first substance does not change of more than 10%, preferably ≤5%, more preferably ≤2% in this temperature range.

Preferably, the first substance is at least partially enclosing the first scattering structures, more preferably contacting the first scattering structures at all sides which are not contacting the first substrate. Thus, the first scattering structures are preferably enclosed by the first substrate on one side and the first substance on all other sides.

In a preferred embodiment, the second substance comprises a polymer and/or a liquid crystal, whose physical properties can be changed between a first state and a second state depending on an electrical control signal. Preferably, changing the physical property of the second substance results in an amended refractive index of the second substance. Preferably, the refractive index of the second substance is continuously amendable between a minimum and a maximum value. A continuous band of the refractive index of the second substance is preferably achieved by amending the percentage of the polymer and/or the liquid crystals in the first or second state.

It is preferred that the real part n and/or the imaginary part K of the variable refractive index ($n_2+ik_2$) of the second substance is shiftable by the control signal to the respective value of the first substance. As described below, it will be advantageous if the shiftable refractive index of second substance is able to be tuned to the same value as the refractive index of the first substance (e.g. $n_1=1.5$, $k_2=0$ for PMMA). If this is the case, the light scattering of a unit cell becomes very weak ("off" state).

Preferably, the second substance is selected from a group comprising a polymer, a conducting polymer, an electrochromic polymer, a polymer, which is electrochemically switchable between an oxidized and a reduced state, a polymer comprising conjugated double bonds and/or conjugated p-orbitals and a polymer comprising a plurality of aromatic rings, most preferably the second substance is selected from a group comprising a substituted or nonsubstituted polyaniline, poly-3,4-ethylendioxythiophen (PEDOT) and polypyrrole.

Preferably, the second substance comprises a liquid crystal. Preferably, the liquid crystal provides a nematic phase. The nematic phase is preferably uniaxial nematic but could also be biaxial nematic. Uniaxial nematic phases are preferred since they provide only one optical axis along which polarized light can pass through the sample without changing its polarization state. The refractive index of such (uniaxial nematic or biaxial nematic) phases is strongly depending on the orientation of the liquid crystal. Thus, adjusting the orientation by an electric field allows control of the refractive index.

Preferably the electrodes do not contribute to the optical properties of the metasurface. More preferably the optical dynamic functionalities of an array or the metasurface are defined only by the first and second scattering structures and the respective first and second substances, which exhibit broadband tunable optical responses to the external voltages.

Preferably the metasurface could be tuned to provide the desired (deflective and/or diffractive) functionality to a wide range of wavelengths. Thus, the optical component preferably provides broadband functionality.

Preferably, the electrodes are supported by a common substrate. The metasurface is preferably located between this substrate and a top layer arranged spaced apart from the metasurface in a direction orthogonal to the extension directions of the metasurface. In a preferred embodiment, the top layer serves as a counter electrode for the electrodes supporting the pairs of first and second scattering structures. If the second substance is an electroactive polymere, the room between top electrode and arrays is filled with a suitable electrolyte, dependent on the polymer used. If the second substance is liquid crystal, the room between the top electrode and arrays is preferably filled with the second substance as well. In this case, the top electrode's inner surface preferably features a suitable polymer layer which is rubbed in a way such that the liquid crystals align parallel with the longitudinal directions of the arrays.

In a preferred embodiment, the first substrate comprises silica, preferably quartz. The chemical properties (especially electrochemical properties) of silica, especially quartz, could be easily adapted to specific needs. In a particularly preferred embodiment, the carrier consists of quartz, which is provided with a conductive coating. As mentioned above with respect to the material of the scattering structures, "consists" should be understood in such a way, that impurities up to a certain degree are tolerated. The coating preferably is a metal containing. Many metals could be easily applied as thin layer on the quartz surface by desorption from the gaseous phase. A coating comprising or preferably consisting of an indium tin oxide has been found to be especially suitable.

Preferably the first substrate comprises a quartz layer ($SiO_2$). Preferably the quartz layer has a thickness of 50-200 nm, preferably 80-120 nm, more preferably about 100 nm. Preferably, the first substrate comprises a further layer, which is preferably reflective. The quartz layer is preferably arranged on a (reflective) surface of the (reflective) layer. Since the quartz layer is transparent for a wide range of wavelength (at least of visible light), light can pass through the quartz layer and is reflected by the reflective layer. The (transparent) spacing between the reflective layer and the nanorods, could enhance the scattering efficiency of the whole metasurface. The spacing could act as a cavity resonator.

The further (reflective) layer of the first substrate preferably comprises a reflective material. Metals, metalloids and/or oxides are preferred. The metal or metalloid (or the metal or metalloid of an oxide) is preferably selected from a group comprising silicon (Si), gold (Au), silver (Ag), chromium (Cr), platinum (Pt), palladium (Pd), iridium (Ir), rhodium (Rh), tantalum (Ta) and/or an alloy comprising one of these metals or metalloids. These metals and/or metalloids are preferred since they are available in high purities and/or provide reflective properties. Furthermore, they are unreactive or chemically inert. In a further preferred embodiment, the further (reflective) layer of the first substrate comprises mica. Mica is less expensive than most of the metals or metalloid but is also high reflective (for visible light).

Preferably, the further reflective layer comprises silicon (Si), wherein a quartz layer ($SiO_2$) is arranged on one of its surfaces. The quartz layer ($SiO_2$) could be deposited on top of the silicon layer or could be generated by (auto-) oxidation. In an especially preferred embodiment, the reflective silicon layer is covered by a quartz layer having a thickness of about 100 nm. On the surface of the quartz layer which is opposed to the silicon layer indium tin oxide is deposited locally. The thickness of the indium tin oxide is preferably in the range between 10 and 50 nm, preferably in the range of 15 to 25 nm. Indium tin oxide is preferred since it is a transparent and conducting oxide. Thus, it provides electrical conductivity and optical transparency. The locally applied indium tin oxide preferably serves as (bottom) electrodes of the metasurface.

The invention is further directed to a LIDAR system comprising an optical component as described above. As described above, it is possible to tune the properties of the metasurface in such a way, that its (preferably first order) diffraction angle changes in a time dependent manner. This feature could even be realized without any moving parts, e.g. mirrors. Thus, a LIDAR system comprising an optical component as described above could be much smaller than previously known systems. Furthermore, moving parts could be omitted, which increases durability and reliability.

Preferably, such a LIDAR system comprises a pulsed light source and a controller, which is suitable and intended for applying an identical control signal to a defined number of the electrodes. Thus, the optical properties of the metasurface could be set to specific needs. For example, the light emitted by the light source could be diffracted by the metasurface by a defined angle. Preferably, applying an identical control signal to a defined number of the electrodes is synchronized with the pulsed light source. Thus, after every pulse of the light source the optical properties of the metasurface could be amended. This allows for example that every pulse of the light is diffracted by the metasurface by a defined angle. Preferably, the pulsed light source is a laser. This is advantageous since laser emits light that is coherent and usually monochromatic (or having a very narrow spectrum). Since the diffraction angle of a grating is dependent on the wavelength of the light, (monochromatic) lasers allow that a large portion of emitted light is diffracted by the metasurface by the same defined angle with a reasonable sharp angle distribution.

In a further (less) preferred embodiment, the light source is not pulsed. Even if the emitted light is not pulsed, the light leaving the metasurface will be pulsed, since the angle in which the (not pulsed) light is diffracted, depends on the current properties of the optical component. Since the properties of the optical component change based on the control signals applied to the electrodes, each application of a different set of control signals to the electrodes results in a different diffraction angle. Thus, continuously emitted light is diffracted by the metasurface in a pulsed manner, whereas the timing of the controller and/or the timing of the application of different sets of control signals predefine the pulse of the diffracted light.

In a preferred embodiment of the LIDAR system, a number x of electrodes between two electrodes to which the identical control signal is applied is increased after each pulse of the light source. As described above with respect to the optical component as such, increasing the number x of electrodes (or arrays) between two electrodes (or arrays) to which the identical control signal is applied results in an increased periodicity of the metasurface. The increased periodicity of the metasurface correlates with a decreased deflection angle of light of a defined wavelength. Thus, the light emitted by the light source is deflected by a different angle after each pulse. Thus, the light of a subsequent pulse will be deflected by the metasurface by a different angle even if the position of the metasurface and the light source are not changed with respect to each other.

It should be understood that the above mentioned advantages could also be achieved if the number x of electrodes between two electrodes to which the identical control signal is applied is decreased after each pulse of the light source. In this case a similar effect occurs. However, the direction of angle values of the deflected light is inverted. Thus, in a further preferred embodiment, a number x of electrodes between two electrodes to which the identical control signal is applied is decreased after each pulse of the light source.

Preferably, x is set equal to 1 as soon as x has reached or exceeded a predefined threshold value. Thus, the above-mentioned sequence of continuously decreased deflection of the light emitted by the light source could be repeated.

Preferably, the optical device and/or the LIDAR system is set up, suitable and/or intended to execute the method described below and all method steps described in connection with the method individually or in combination with one another or individual method steps using the same. Conversely, the method and in particular the optical device and/or the LIDAR system described in this context may be equipped with all the features described in the context of the optical device and/or the LIDAR system, either individually or in combination with one another. In particular, the optical device and/or the LIDAR system described above can be used to carry out the method described below.

The invention is further directed to a method for amending a deflection angle of an optical component. An optical component suitable for this method comprises a metasurface, wherein the metasurface comprises a repeating pattern of unit cells, wherein each unit cell comprises at least two different scattering structures. The first scattering structures are at least partially contacting a first substance having a first refractive index and the second scattering structures are at least partially contacting a second substance, which differs from the first substance. The second substance provides a refractive index, which is variable depending on an electrical control signal. A plurality of unit cells is arranged in an aligned manner on electrodes. Such an aligned arrangement of unit cells on a common electrode should also be referred to as an array. The method is characterized by the step, that the refractive index of the second substance associated to selected electrodes is amended by applying a control signal to these electrodes.

Preferably, the deflection angle of the optical component is stepwise amended from a maximal deflection angle to a minimal deflection angle by increasing the number x of electrodes between two electrodes to which an identical control signal is applied.

Preferably, the deflection angle of the optical component is amended synchronously to pulses of a light source, preferably a laser.

Further advantages, aims and properties of the present invention will be described by way of the appended drawings and the following description.

IN THE DRAWINGS

Figure 3:
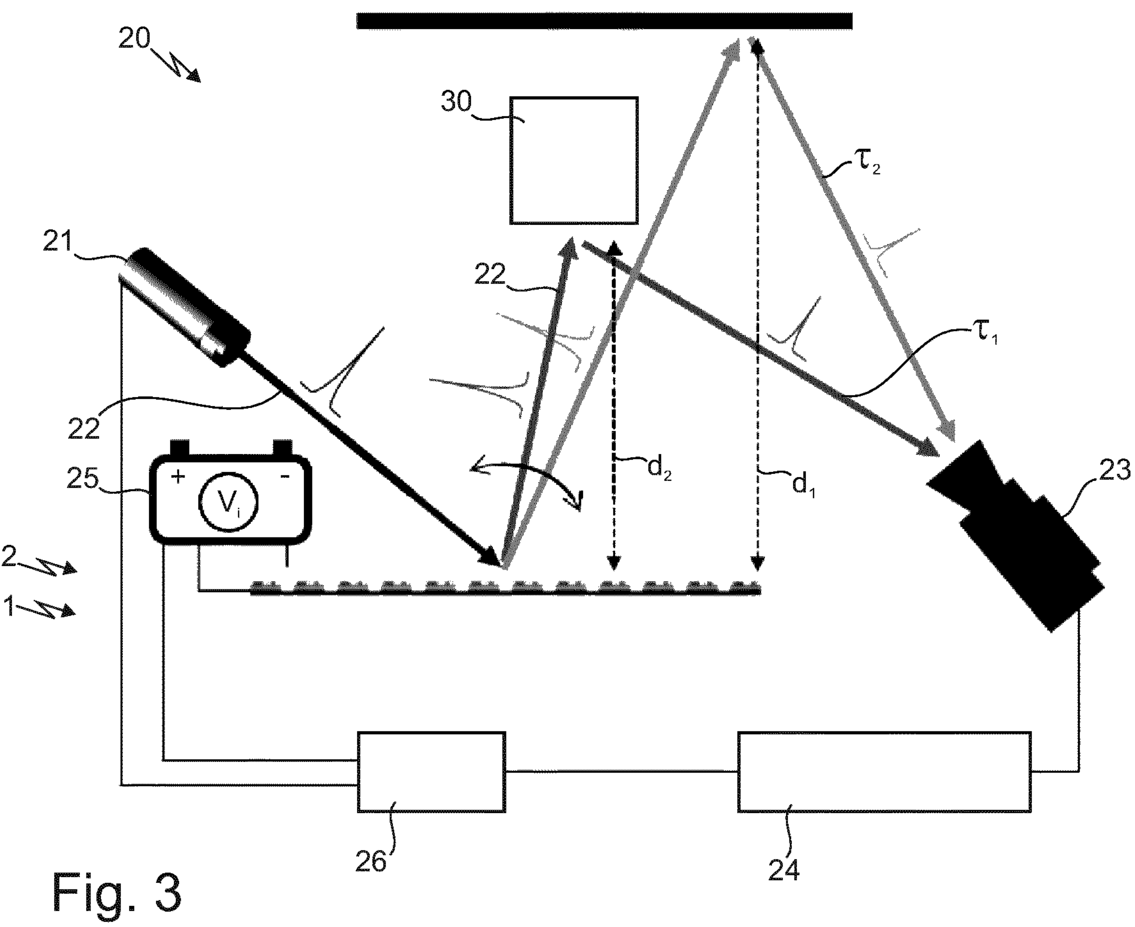

FIG. 2A-F show examples of the first order diffraction angle depending on different patterns applied to the metasurface;

FIG. 3 shows a schematic of an LIDAR system.

Figure 1A:
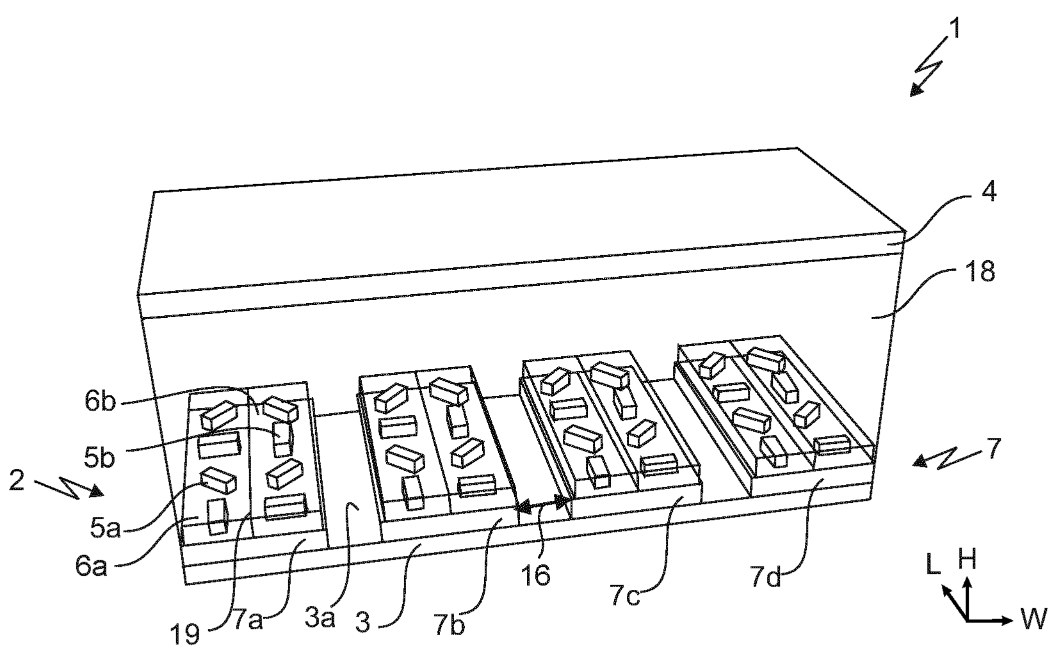
FIG. 1A shows an example of an optical component according to the invention.
Figure 1B:
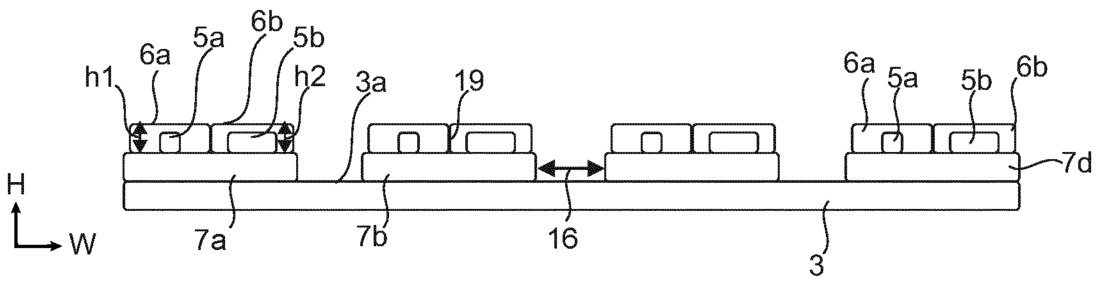
FIG. 1B is a side view of parts of the optical component shown in FIG. 1A.

FIGS. 1A and 1B show an example of an optical component (1) according to a preferred embodiment of the invention from different perspectives. As illustrated in FIG. 1A, a planar metasurface (2) is arranged between an upper surface (3*a*) of a first substrate (3) and a top layer (4). While the metasurface is arranged directly on the upper surface (3*a*) of the first substrate (3), the top layer (4, not shown in FIG. 1B) is spaced apart along a height direction (h). The first substrate (3) supports a plurality of (bottom) electrodes (7*a-d*). Between the top layer (4) and each electrode (7*a-d*) an individual electric potential ($V_1$-$V_4$) could be applied. To allow the application of an electric potential ($V_1$-$V_4$), a dielectric material (18) is provided in the volume between the metasurface and the top layer (4). This dielectric material (18) serves as a spacer and should be transparent in the wavelength spectrum of interest.

Each bottom electrode (7*a-d*) supports a plurality of scattering structures (5, 5*a*, 5*b*). The scattering structures (5*a*, 5*b*) are arranged pairwise in lines along a longitudinal direction (L) of each electrode (7). The pairs of first and second scattering structures (5*a*, 5*b*) are arranged on the electrodes in such a way, that all first scattering structures (5*a*) are arranged on one side of the electrode (in its width direction), and all second scattering structures (5*b*) are arranged on the other side of the electrode and oriented in respect to each other, such that light scattered by the first scattering structure shows a phase difference of IT in respect to the light scattered by the second scattering structure. Thus, the metasurface (2) comprises a plurality of alternating structures of first and second scattering structures (5*a*, 5*b*), wherein each pair of first and second scattering structures (5*a*, 5*b*) is separated from the neighboring pair of first and second scattering structures (5*a*, 5*b*) located on the next electrode in the width direction (W) by a gap (16).

The first scattering structures (5*a*) are covered with a first substance (6*a*) having a first refractive index, whereas the second scattering structures (5*b*) are covered with a second substance (6*b*), which differs from the first substance and which provides a variable refractive index depending on a control signal. The refractive index $\tilde{n}_2=(n_2+ik_2)$ of a substance is defined by a real part n and/or an imaginary part K. Preferably the refractive index $\tilde{n}_2$ of the second substance (6*b*) could be electrically tuned to be preferably close, more preferably equal to the refractive index $n_1$ of the first substance (6*a*). Such a system comprising a bottom electrode (7), aligned pairs of first and second scattering structures (5*a*, 5*b*) and first and second substances (6*a*, 6*b*) covering the first and second scattering structures (5*a*, 5*b*) respectively, are also denoted as "array" (17).

The control signal is preferably an electric potential ($V_1$, $V_n$) applied between the top layer (4) and bottom electrodes (7*a-d*). In the illustrated example the first and second scattering structures (5*a*, 5*b*) are arranged in alternating lines. The first substance (6*a*) covering the first scattering structures (5*a*) is a dielectric material. The second substance (6*b*) covering the second scattering structures (5*b*) comprises an electrochromic polymer or a liquid crystal.

The geometry of all scattering structures (5, 5*a*, 5*b*) in this example is the same, a rectangular cuboid. Since these structures are preferably made of gold, also the term "gold nanorods" or "AuNR" is used instead of "scattering structures". It should be understood that preferred embodiments only disclosed for "gold nanorods" (5, 5*a*, 5*b*) could also be applied to "scattering structures", not comprising gold and/or having a different geometry. However, gold nanorods are preferred since they could be fabricated by electron-beam lithography (EBL) on an ITO-coated quartz substrate. The size of the gold nanorods (5, 5*a*, 5*b*) is 200 nm×80 nm×50 nm.

In the example, the first scattering structures (5*a*) (located left on each electrode (7)) are covered by PMMA ($h_1$=100 nm) through a double-layer EBL process. The gold nanorods second scattering structures (5*b*) (located right on each electrode (7)) have been covered with PANI by electrochemical polymerization of the metasurface sample in an aqueous electrolyte containing (2 M) $HNO_3$ and (0.1 M) aniline.

The longitudinal direction of each cuboid (5) extends in the plane of the upper surface (3*a*) of a first substrate (3). However, the direction in this plane differs between some of the scattering structures (5, 5*a*, 5*b*). The different in-plane orientations of the scattering structures (5, 5*a*, 5*b*), which function as optical antennas, allows shaping light wavefronts via a geometric phase, e.g., Pancharatnam-Berry (PB) phase. The scattering structures are of subwavelength dimension as well as the spacing between adjacent scattering structures (5, 5*a*, 5*b*) and/or lines (8*a*, 8*b*) of differently covered scattering structures (5, 5*a*, 5*b*).

FIG. 1B shows a cross section of the metasurface (2), the electrodes (7) and the first substrate (3). The top electrode (4) is not shown. The height of all nanorods (5, 5*a*, 5*b*) is identical. Also, the height ($h_1$, $h_2$) of the layers of the first and second substance (6*a*, 6*b*) is identical. Preferably, the first substance (6*a*) covers a line of gold nanorods (5*a*) and thereby forms a continuous band along the electrode (7). Also, the second substance (6*b*) covers a line of gold nanorods (5*b*) and forms a further continuous band along the electrode (7). Both bands have a nearly rectangular cross section. Preferably both bands are contacting each other along a contact surface (19). Preferably, each array (17) is electrically isolated with respect to the next array (17) in the width direction (W) by an isolating barrier, preferably a gap (16).

Figure 1C:
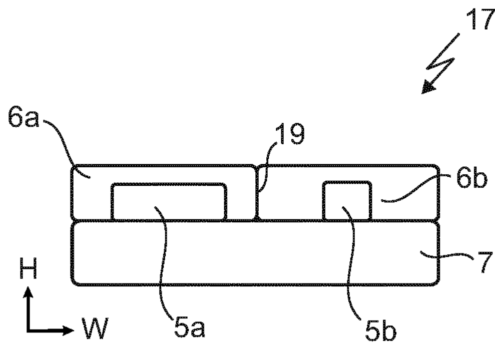
FIG. 1C is a side view of a single unit cell as shown in FIG. 1B.

FIG. 1C shows a cross section of a single unit cell supported on an electrode (7). The unit cell comprises two scattering structures (5*a*, 5*b*) supported on the same electrode (7), wherein the first scattering structure (5*a*) is at least partially covered by a first substance (6*a*) and the second scattering structure (5*b*) is at least partially covered by a different second substance (6*b*). The top electrode (4) is not shown. The height of all nanorods (5, 5*a*, 5*b*) is identical. Also, the height ($h_1$, $h_2$) of the layers of the first and second substance (6*a*, 6*b*) is identical. The layers of the layers of the first and second substance (6*a*, 6*b*) preferably have a nearly rectangular cross section, which contact each other along a contact surface (19). Both layers of the first and second substance (6*a*, 6*b*) preferably have the same width along the width direction (W). Thus, the contact surface (19) is preferably located in the center of an array (17) (with respect to its width direction).

The optical properties of such a metasurface (2) could be controlled by applying an electrical potential ($V_1$-$V_4$) between at least some of the bottom electrodes (7*a*-7*d*) and the top electrode (4). As a response to such an electrical potential (V), the second substance (6*b*) changes its refractive index. When $\tilde{n}_2$ is electrically tuned to be preferably close, more preferably equal to $\tilde{n}_1$ and the heights ($h_1$, $h_2$) of the bands of the first and second substance (6*a*, 6*b*) are identical, the light output from a designated array (17) associated to a specific electrode (7) is zero ("off" state) due to destructive interference of the remaining PB phase difference of TT, introduced by the mutual orientation of the first and second scattering structure. On the contrary, when $\tilde{n}_2$ is electrically tuned to differ from $\tilde{n}_1$, the phase relation between the static and dynamic gold nanorods on a particular electrode can be widely tuned to achieve maximum light scattering ("on" state). In other words, each electrode can be independently controlled by a potential $V_i$ (i=1, 2, . . . , n) to switch the scattered light between zero and maximum intensities.

An array (17) of such electrode elements acts as a grating with an electrically tunable periodicity (p). The diffraction angle of the output light can thus be dynamically adjusted to achieve beam steering. The maximum spatial frequency determines the maximum angle of the first order diffraction, according to the grating equation, $$\sin(\theta) = \frac{\lambda}{p},$$

where λ is the wavelength of the incident circularly polarized light and p is the tunable periodicity. Because the light output from each individual electrode element can be continuously adjusted between zero and the maximum intensity by the external potential, quasi-continuous spatial patterns can be realized, e.g. sinusoidal grating profiles or blazed grating profiles. The latter helps to optimize the efficiency of the desired modes by minimizing the contribution from the undesired modes (in particular the zero order).

As a response to this switching of individual arrays (17), a pattern of different optical properties could be applied to the metasurface (2). Such a pattern furthermore changes the optical properties of the entire metasurface (2). In the illustrated embodiment, the pattern could result in a grating providing a desired grating constant. Thus, the optical properties of the metasurface (2) are not only (locally) defined by the properties of a single array (17) but also by the pattern of optical properties of a plurality of arrays (17).

FIG. 2A-F show the optical component (1) from FIG. 1A when different patterns of control signals are applied to the electrodes (7) of the metasurface (2). The top electrode (4) is not shown. The optical properties of each array (17) are indicated by the letters "A", "B" and "C". The letter "A" correlates to the above-mentioned "on" state, in which the maximum light output of an array (17) could be achieved. The letter "B" correlates to the above-mentioned "off" state, in which the light output of an array (17) is minimal due to destructive interference. The letter "C" correlates to any intermediate state, in which the light output of an array (17) is between the maximum and the minimum output. An index "$C_n$" (e.g. "$C_1$" "$C_2$") indicates that different arrays (17) could provide different intermediate states (e.g. a first intermediate state "$C_1$" and a second intermediate state "$C_2$"). For clarity reasons, FIGS. 2A-E only show the first order diffraction within the right hand side half space. Furthermore, only 12 arrays (17) are shown.

Figure 2:
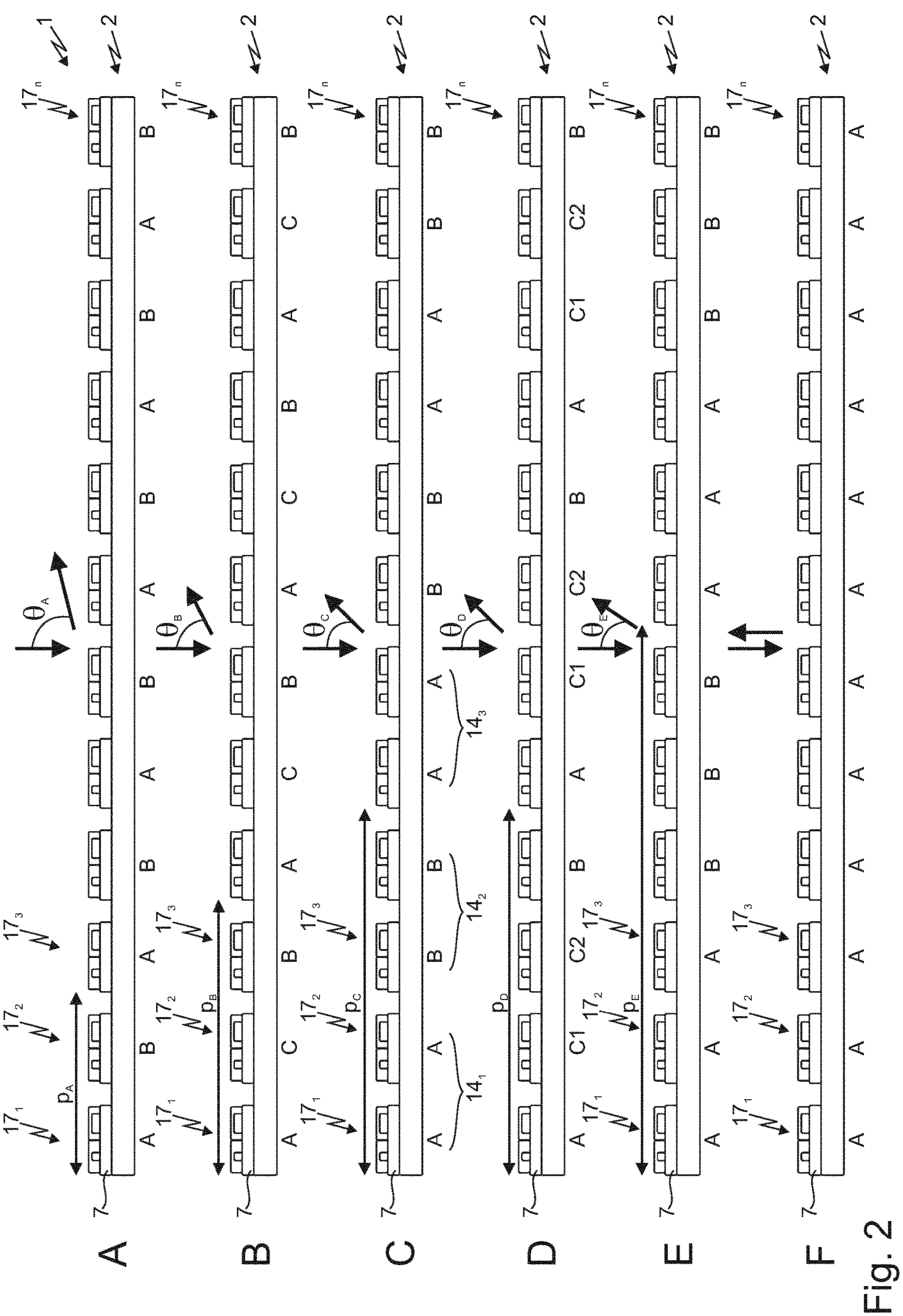

FIG. 2A shows the optical component (1) from FIG. 1A when a pattern of control signals is applied to the electrodes (7) of the metasurface (2), in which the same control signal is applied to every second array (17). In the illustrated embodiment, an alternating pattern of states "A" and "B" is applied. In this embodiment a large (first order) diffraction angle (θ) is achieved with a large spatial frequency, due to a small periodicity (p). The width of the periodicity (p) in this case correlates to the width of only 2 arrays (17) (including the respective gaps).

FIG. 2B shows the optical component (1) from FIG. 1A when another pattern of control signals is applied to the electrodes (7) of the metasurface (2). In this embodiment the periodicity (p) is 3. The same control signal is applied to every third array (17). In the illustrated embodiment, a repeating pattern of states "A", "C" and "B" is applied. In this embodiment a (first order) diffraction angle (θ) is reduced with respect to the embodiment shown in FIG. 2A since the periodicity (p) in increased. With respect to the embodiment shown in FIG. 2A, the number of arrays (17) between two arrays (e.g. $\mathbf{17}_1$ and $\mathbf{17}_4$) to which an identical control signal is applied, is increased (from only 1 to 2).

FIG. 2C shows the optical component (1) from FIG. 1A when a further pattern of control signals is applied to the electrodes (7) of the metasurface (2). In this embodiment the periodicity (p) is 4. The same control signal ("A") is applied to two neighboring arrays (17). These arrays form a block (14) of neighboring arrays (17) to which an identical control signal is applied. Blocks (14) to which an identical control signal is applied are separated from each other by another block (14), to which a different control signal ("B") is applied. In this embodiment a (first order) diffraction angle (θ) is further reduced with respect to the embodiment shown in FIG. 2B since the periodicity (p) in increased. With respect to the embodiment shown in FIG. 2A, the number of neighboring arrays (e.g. $\mathbf{17}_1$ and $\mathbf{17}_2$) to which an identical control signal is applied, is increased (from only 1 to 2).

FIG. 2D shows the optical component (1) from FIG. 1A when a further pattern of control signals is applied to the electrodes (7) of the metasurface (2). In this embodiment the periodicity (p) is 4. Thus, the periodicity (p) is the same as shown in FIG. 2C. However, this periodicity (p) of 4 is achieved in a different manner. The same control signal ("A") is applied to every forth array (17). In the illustrated embodiment, a repeating pattern of states "A", "$C_1$", "$C_2$" and "B" is applied. In this embodiment a (first order) diffraction angle (θ) is reduced with respect to the embodiment shown in FIGS. 2A and 2B since the periodicity (p) in increased to 4. With respect to the embodiment shown in FIG. 2B, the number of arrays between two arrays (e.g. $\mathbf{17}_1$ and $\mathbf{17}_5$) to which an identical control signal is applied, is further increased (from 2 to 3).

The shape of the pattern illustrated in FIG. 2D differs from that illustrated in FIG. 2C. While the shape of the pattern illustrated in FIG. 2C is a step-pattern (repeating units of "A-A-B-B"), the pattern illustrated in FIG. 2D correlates to a sawtooth-pattern (having the same periodicity (p)). This could be achieved, if the difference of the refractive index $\tilde{n}_1$ and $\tilde{n}_2$ of the arrays (17), to which the control signal "$C_1$" and "$C_2$" is applied, correlates to values between that of "A" and "B". in this embodiment having a periodicity of 4, "$C_1$" preferably correlates to ⅔ "A" and "$C_2$" preferably correlates to ⅓ "A". Thus, a pattern could be achieved in which the difference of the optical properties between neighboring arrays (17) is reduced with respect to the embodiment illustrated in FIG. 2C. This could be advantageous with respect to the optical properties of the metasurface (2).

FIG. 2E shows the optical component (1) from FIG. 1A when a further different pattern of control signals is applied to the electrodes (7) of the metasurface (2). In this embodiment the periodicity (p) is set to 6. The same control signal ("A") is applied to a triplet of neighboring arrays (17, 17$_1$, 17$_2$ and 17$_3$). These arrays form a block (14) of neighboring arrays (17) having similar optical properties and having a width of three arrays (17). Each block (14) is separated from the next block (14), to which an identical control signal is applied, by another block (14), to which a different control signal ("B") is applied. In this embodiment the separating block (14$_2$) has the same width as the separated blocks (14$_1$ and 14$_3$). Thus, the periodicity (p) is 6. However, it is not mandatory that the width of all blocks (14) is identical. It is even not mandatory that the width of all blocks (14) to which the same control signal is applied is identical. In the illustrated embodiment, the (first order) diffraction angle (θ) of the metasurface (2) is further reduced with respect to the embodiment shown in FIG. 2C since the periodicity (p) in increased. With respect to the embodiment shown in FIGS. 2A and 2C, the number of neighboring arrays (e.g. 17$_1$ to 17$_3$) to which an identical control signal is applied, is increased (from only 1 or 2 to 3).

FIG. 2F shows the optical component (1) from FIG. 1A when a further different pattern of control signals is applied to the electrodes (7) of the metasurface (2). In this embodiment the same control signal "A" is applied to every electrode (7) or array (17). A minimum diffraction angle (θ) of 0° could be achieved with a very large (with respect to the wavelength, preferably a nearly infinitely large) periodicity (p).

FIG. 3 shows a schematic illustration of a LIDAR system (20). Such a system (20) further comprises a light source (21) and uses a metasurface (2) as described above for beam steering in a light scanning unit. The system (20) preferably comprises a time triggered laser source (21). The beam (22) emitted by the laser is scanned across a one-dimensional angle range by applying different patterns of control signals to the metasurface (2). The pulsed laser (21) is reflected by an object (30) at a certain distance (d) and detected by a photodetector (23) to perform a time-of-flight (T) measurement. From the measured time-of-flight (T) the distance ($d_n$) of the reflective object could be calculated. Such a LIDAR system (20) allows measurement of a one-dimensional distance-to-angle relation.

Preferably, the LIDAR system (20) comprises a metasurface (2), a photodetector (23), a signal processor (24), a voltage controller (25), a time trigger (26) and a light source (21) preferably a pulsed laser (21). The metasurface (2) is used as a light scanning unit, which steers an incident time-triggered laser pulse (22). The laser pulse (22) is reflected by an object (30) at a certain distance (d) from the LIDAR system (20) and detected by the photodetector (23). The signal processor (24) performs a time-of-flight (T) measurement and calculates the distance (d) of the reflective object (30) based on the time-of-flight (T), according to d=T c/2, where c is the speed of light in air.

With the voltage controller (25) of the metasurface (2) being integrated in the time trigger circuit (26), the laser beam (22) can be steered across the total accessible angle range (field of view) and a one-dimensional distance-to-angle relation can be obtained from the individual time-of-flight (T) measurements at the corresponding angles. To obtain a two-dimensional distance map, the metasurface (2) unit can be located on top of a tilting stage (not shown), which is able to tilt in the perpendicular direction to the metasurface's scanning direction.

All the features disclosed in the application documents are claimed as being essential to the invention if, individually or in combination, they are novel over the prior art.

LIST OF REFERENCE NUMERALS

1 optical component
2 metasurface
3 first substrate
4 top layer, top electrode
5 scattering structures
5*a* first scattering structures
5*b* second scattering structures
6*a* first substance
6*b* second substance
7,7$_n$ (bottom) electrode
14 block of neighboring arrays
16 gap, isolating material
17, 17$_n$ array
18 dielectric material
19 contact surface
LIDAR system
21 light source, (pulsed) laser
22 (light/laser) beam, laser pulse
23 photodetector
24 (signal) processor
25 (voltage) controller
26 time trigger
30 (reflective) object
A, B, C control signal
L longitudinal direction
W width direction
H height direction
$h_n$ height along direction H
T, $T_n$ time (-of-flight)
D, $d_n$ distance
Θ first order diffraction (deflection) angle
$\tilde{n}_i$ complex refractive index
n, $n_i$ real part of complex refractive index
k, $k_i$ imaginary part of complex refractive index
p, $p_L$ periodicity

The invention claimed is:

1. An optical component comprising a metasurface, wherein the metasurface comprises a repeating pattern of unit cells, wherein each unit cell comprises at least two different scattering structures, wherein at least a portion of the first scattering structures are in direct contact with a first substance having a first refractive index (ñ1) and at least a portion of the second scattering structures are in direct contact with a second substance, which differs from the first substance, wherein the second substance provides a refractive index ($\tilde{n}_2$) which is variable depending on an electrical control signal, wherein a plurality of pairs of first scattering structures contacting the first substance and second scattering structures contacting the second substance are arranged in an aligned manner on electrodes, wherein the first substance contacts the first scattering structures at all sides which are not contacting the electrode, and wherein neighboring electrodes supporting aligned pairs of first and second scattering structures are electrically separated from each other, the optical component further comprising a controller, which is configured to amend a deflection angle (θ) of the optical component synchronized to pulses of a light source, wherein at least two electrodes supporting aligned pairs of first and second scattering structures are electrically connected to the controller, which is configured to apply an individual control signal to each of these electrodes.

2. The optical component according to claim 1, wherein all electrodes supporting aligned pairs of first and second scattering structures are electrically connected to the controller, which is configured to apply an individual control signal to each of these electrodes.

3. The optical component according to claim 1, wherein the electrodes supporting the aligned pairs of first and second scattering structures are linear and arranged parallel to each other.

4. The optical component according to claim 1, wherein neighboring electrodes supporting aligned pairs of first and second scattering structures are electrically separated from each other by a gap or an isolating material.

5. The optical component according to claim 1, wherein the electrical control signal applied to a defined number of electrodes supporting aligned pairs of first and second scattering structures is identical.

6. The optical component according to claim 5, wherein the number of electrodes to which the identical electrical control signal is applied, and/or the number of neighboring electrodes to which the identical electrical control signal is applied, and/or the number of electrodes between two electrodes to which the identical electrical control signal is applied correlates to a defined (first order) diffraction angle (θ) for incoming light in a direction orthogonal to the direction of the alignment of the pairs of first and second scattering structures.

7. The optical component according to claim 1, wherein the first substance comprises a dielectric material and is at least partially enclosing the first scattering structures.

8. The optical component according to claim 1, wherein the second substance comprises a polymer and/or a liquid crystals, whose physical properties are able to be changed between a first state to a second state depending on an electrical control signal.

9. The optical component according to claim 8, wherein changing of one or more of the physical properties results in an amended refractive index ($\tilde{n}_2$) of the second substance.

10. The optical component according to claim 9, wherein the refractive index ($\tilde{n}_2$) of the second substance is continuously amendable between a minimum and a maximum value, depending on the percentage of the polymer and/or the liquid crystals in the first and second state.

11. The optical component according to claim 1, wherein the real part n and/or the imaginary part K of the variable refractive index ($\tilde{n}_2$) of the second substance is shiftable by the control signal to the respective value of the first substance.

12. The optical component according to claim 1, wherein the scattering structures are deployed as optical resonators.

13. The optical component according to claim 12, wherein the scattering structures are in the form of rods, which are orientated in the plane of the metasurface in spatially varying orientations.

14. A light detection and ranging (LIDAR) system comprising an optical component according to claim 1.

15. The LIDAR system according to claim 14 comprising a pulsed light source wherein the controller is configured to apply an identical control signal to a defined number of the electrodes.

16. The LIDAR system according to claim 15, wherein a number x of electrodes between two electrodes to which the identical control signal is applied is increased after each pulse of the light source, wherein x is set equal to one as soon as x has reached or exceeded a predefined threshold value.

17. A method for amending a deflection angle (θ) of an optical component, wherein the optical component comprises a metasurface, wherein the metasurface comprises a repeating pattern of unit cells, wherein each unit cell comprises at least two different scattering structures, wherein at least a portion of the first scattering structures are in direct contact with a first substance having a first refractive index ($\tilde{n}$1) and at least a portion of the second scattering structures are in direct contact with a second substance, which differs from the first substance, wherein the second substance provides a refractive index ($\tilde{n}_2$) which is variable depending on an electrical control signal, wherein a plurality of pairs of first scattering structures contacting the first substance and second scattering structures contacting the second substance are arranged in an aligned manner on electrodes, wherein the first substance contacts the first scattering structures at all sides which are not contacting the electrode, wherein at least two electrodes supporting aligned pairs of first and second scattering structures are electrically connected to a controller, which is configured to apply an individual control signal to each of these electrodes, said method comprising the step of amending the refractive index ($\tilde{n}_2$) of the second substance associated to selected electrodes by applying a control signal to these electrodes, wherein the deflection angle (θ) of the optical component is amended synchronously to pulses of a light source.

18. The method according to claim 17, wherein the deflection angle (θ) of the optical component is stepwise amended from a maximal deflection angle (θ) to a minimal deflection angle (θ) by increasing the number x of electrodes between two electrodes to which an identical control signal is applied.

* * * * *